Figure 1:
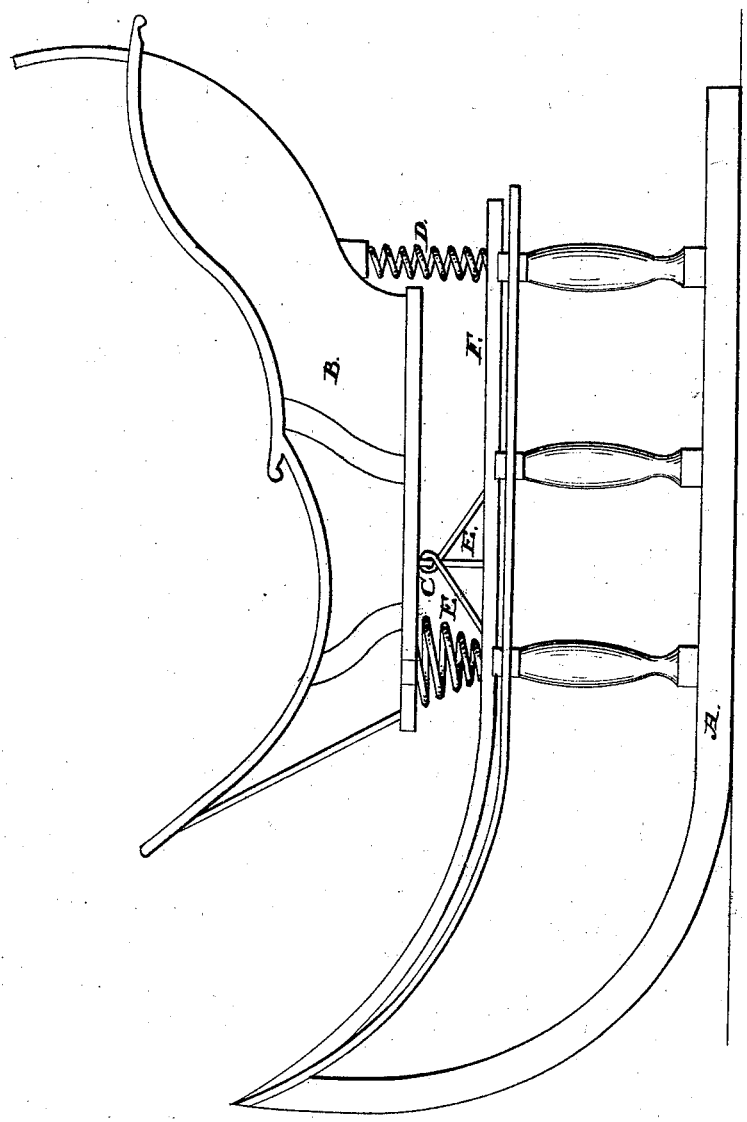
Figure 2:
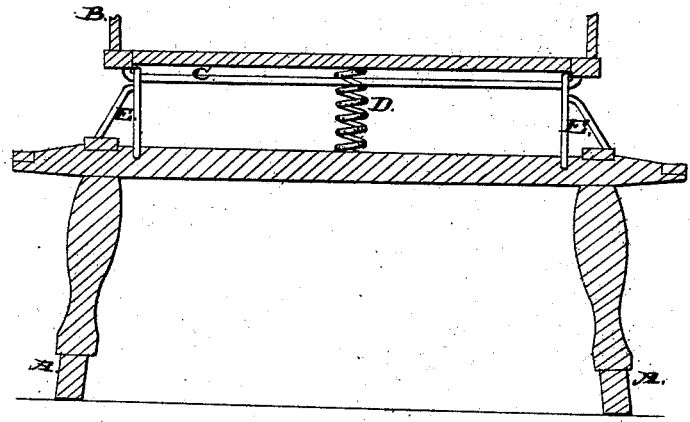

T. R. TIMBY.
Sleigh.

No 2,613.

2 Sheets—Sheet 1

Patented May 7, 1842.

2 Sheets—Sheet 2.

T. R. TIMBY.

Sleigh.

No 2,613.

Patented May 7, 1842.

UNITED STATES PATENT OFFICE.

THEO. R. TIMBY, OF AUBURN, NEW YORK.

MANNER OF CONNECTING THE BODY WITH THE RUNNERS OF SLEIGHS.

Specification of Letters Patent No. 2,613, dated May 7, 1842.

*To all whom it may concern:*

Be it known that I, THEODORE R. TIMBY, of Auburn, Cayuga county, State of New York, have invented a new and useful Improvement in Sleighs, which is described as follows, reference being had to the annexed drawings of the same, making part of this specification.

The runners A and body B are made in the usual manner.

The improvement consists in hanging the body or box B on an axle C or balance rod in combination with one or more springs D placed under the body and upon the frame F of the runners A.

The axle or balance rod C is secured to the under side of the body in any convenient manner and turns in apertures in the heads of standards E fastened to the top of the frame F of the runners near the middle of the same.

The springs D are attached by their upper ends to the under side of the body at the front and rear having their lower ends attached to and resting upon the cross timbers of the frame of the runners or in any convenient situation.

What I claim as my invention and which I desire to secure by Letters Patent is—

Placing the box or body on an axle or balance rod in combination with one or more springs arranged under the body in the above described manner or in any other substantially the same.

THEODORE R. TIMBY.

Witnesses:
 WM. P. ELLIOT,
 GEORGE DAVIS.